United States Patent [19]
Nieminen et al.

[11] Patent Number: 5,616,894
[45] Date of Patent: Apr. 1, 1997

[54] PROCEDURE FOR SUPPLYING, STORING AND DISPLAYING ELEVATOR CONTROL DATA

[75] Inventors: Juha Nieminen; Aki Tamminen, both of Hyvinkää; Petri Huotari, Muurla; Reima Reinvall, Hyvinkää; Marjo Kauppinen, Helsinki; Kimmo Heikkilä, Hyvinkää, all of Finland

[73] Assignee: Kone Oy, Helsinki, Finland

[21] Appl. No.: 589,574

[22] Filed: Jan. 22, 1996

Related U.S. Application Data

[63] Continuation of Ser. No. 273,859, Jul. 12, 1994, abandoned, which is a continuation of Ser. No. 213,070, Mar. 15, 1994, abandoned.

[30] Foreign Application Priority Data

Mar. 17, 1993 [FI] Finland ................. FI 931173

[51] Int. Cl.[6] ................. B66B 3/00; B66B 5/00; B66B 1/00
[52] U.S. Cl. ................. 187/247; 187/391; 187/393
[58] Field of Search ................. 187/247, 391, 187/393, 384

[56] References Cited

U.S. PATENT DOCUMENTS

| | | | |
|---|---|---|---|
| 4,512,442 | 4/1985 | Moor et al. | 187/29 R |
| 4,690,243 | 9/1987 | Ichioka | 187/101 |
| 4,930,604 | 6/1990 | Schienda et al. | 187/133 |
| 5,042,621 | 8/1991 | Ovaska et al. | 187/133 |
| 5,159,163 | 10/1992 | Bahjat et al. | 187/133 |
| 5,257,176 | 10/1993 | Uetani | 364/148 |
| 5,307,903 | 5/1994 | Morita et al. | 187/124 |

FOREIGN PATENT DOCUMENTS

| | | | |
|---|---|---|---|
| 316280 | 5/1989 | European Pat. Off. | |
| 366097 | 5/1990 | European Pat. Off. | B66B 5/00 |
| 501092 | 9/1992 | European Pat. Off. | G05B 19/10 |
| 512575 | 11/1992 | European Pat. Off. | B66B 1/46 |
| 4135577 | 5/1993 | Germany | |
| 4-323178 | 11/1992 | Japan | B66B 1/14 |
| 5-24748 | 2/1993 | Japan | B66B 1/18 |
| 2231690 | 11/1990 | United Kingdom | |

*Primary Examiner*—Robert Nappi

[57] ABSTRACT

A procedure supplies and modifies the data required in the control system of an elevator and for displaying the instructions needed for installation, maintenance and adjustment on a display comprised in the control system. The parameter data of the elevator control system and the instructions for each person carrying out maintenance work are stored in a separate storage unit. When modification or maintenance work is being carried out, a communication link is established between the storage unit and the data storage means of a control unit included in the control system. The data stored in the storage unit is read and saved in the control unit and the modifications and actions required by the data read from the storage unit are carried out in the control unit.

33 Claims, 1 Drawing Sheet

PROCEDURE FOR SUPPLYING, STORING AND DISPLAYING ELEVATOR CONTROL DATA

This application is a continuation, of application Ser. No. 08/273,859 filed on Jul. 12, 1994, now abandoned which is a Rule 60 continuation application of Ser. No. 08/213,070 filed on Mar. 15, 1994 now abandoned.

BACKGROUND OF THE INVENTION

1. Field of the Invention

The present invention relates to a procedure for supplying and modifying the data required in the control system of an elevator and for producing the instructions needed for installation, maintenance and adjustment on a display comprised in the control system.

2. Description of Related Art

Modern elevator control systems make it possible to realize numerous different applications designed to take into account the requirements imposed by the users and purchasers of an apparatus or by its operating process and environment. For example, in door control systems, the operation of signalling devices or the rights of operation can be altered by suitably modifying the elevator control data.

In previously known technology, the changes referred to have been made by changing the circuit card in the control unit which determines the function in question. For this reason, it has been necessary to design special circuits for each application. Similarly, the updating of programs and parameters has required the replacement of memory circuits. Especially during installation and testing, changes have to be made several times.

When carrying out installation, maintenance and repair operations, installers need instructions stored in the memory of the control unit. The extent and degree of detail of the instructions are determined on the basis of the installers' requirements, experience and knowledge. The control unit must be equipped with corresponding memory circuits for each elevator.

When servicing an elevator, the installation personnel often need to make modifications in the programming because of the user's requirements and equivalent reasons. This is generally done via an operator interface fitted in conjunction with the control unit of the elevator. The operator is guided in his actions by instructions given via a display unit fitted in the operator interface. The operation of the operator interface as well as the manner of presentation and extent of the information presented through the display can be modified to suit each operator.

When the elevator belongs to an elevator group certain parameters are common to all elevators of the group. Every elevator in the group has the same group parameters, which must be installed manually to every elevator.

When the control system of an elevator is being installed, the elevator-specific configuration and parameter data are transferred to the elevator control system. Most of this data effects to many different parts of the elevator system. The system needs to know in which floor there is a door, i.e. the allowed landing floors, e.g., in elevator control, in motor control or in door control. After a break in the power supply the elevator must know this data. Some of this elevator-specific configuration may also change after installing.

When constructing a new building the elevators function in a different way as in the normal situation. Many parameters must be changed for construction time use and later to the normal use.

SUMMARY OF THE INVENTION

The object of the invention is to eliminate the problems referred to above and at the same time to achieve a system permitting an installer-friendly implementation of modifications and providing appropriate installer guidance. According to the invention, the program and parameter data of the control system and the instructions for each person carrying out maintenance work are stored in a separate storage unit. When installation, modification or maintenance work is being carried out, a communication link is established between the storage unit and the data storage means of a control unit comprised in the control system, the data stored in the storage unit is read and saved in the control unit and the modifications and actions required by the information read from the storage unit are carried out in the control unit.

In the procedure of the invention, the parameters and configuration of each elevator are set in connection with installation via an operator interface comprised in the control system, using a storage card delivered separately. Similarly, when modifications are made, the corresponding information is supplied to the control system by means of a storage card. In a control system employing serial communication, program and parameter updates are performed using a storage card. The components can be manufactured as standard parts, allowing large production series and simpler and faster testing. The storage card can be used as a means of data storage and transfer when information relating to particular elevator installations is transferred to a service center. Updating this information no longer requires the replacement of memory circuits.

Parameters that are common to all or several elevators of the group are dated simultaneously and in a concentrated way. The operator interface checks which parameters are common to several elevators and takes care that they are all installed automatically to all elevators in the group. Thus it is ensured that every group parameter has the same value in each elevator.

In a decentralized elevator control system the elevator-specific configuration and parameter data are transferred to the elevator control system during the start-up drive. The function of the system can be changed later by changing this data. This information is stored into a non-volatile memory in the operator interface. This memory works as a certain kind of master copy and the other components can read the data from the memory whenever required.

The parameters used during the construction time of the building can be easily installed by the operator interface. Respectively the normal parameters can be installed after the construction has been finished.

The storage card contains failure message texts and the instructions for fault location are loaded in memory, making it easy to produce the fault location instructions relating to each failure message on the operator interface display unit. The instructions can be displayed in the language chosen by the serviceman, and this choice is stored on his storage card. In this application, too, the storage card functions as a means of data storage and transfer when the serviceman gives feedback on the operation, failure density and fault types of an elevator.

According to an embodiment of the procedure, when the operator interface is used without a storage card, it works with basic functions and indicates the associated screens in one language, e.g. English or standard codes. Using a storage card, the language can be selected and the right of operation extended according to the degree of authority of the serviceman.

BRIEF DESCRIPTION OF THE DRAWINGS

In the following, the invention is described in detail by the aid of one of its embodiments by referring to the attached drawings, in which.

DETAILED DESCRIPTION OF THE PREFERRED EMBODIMENTS

Figure 1:
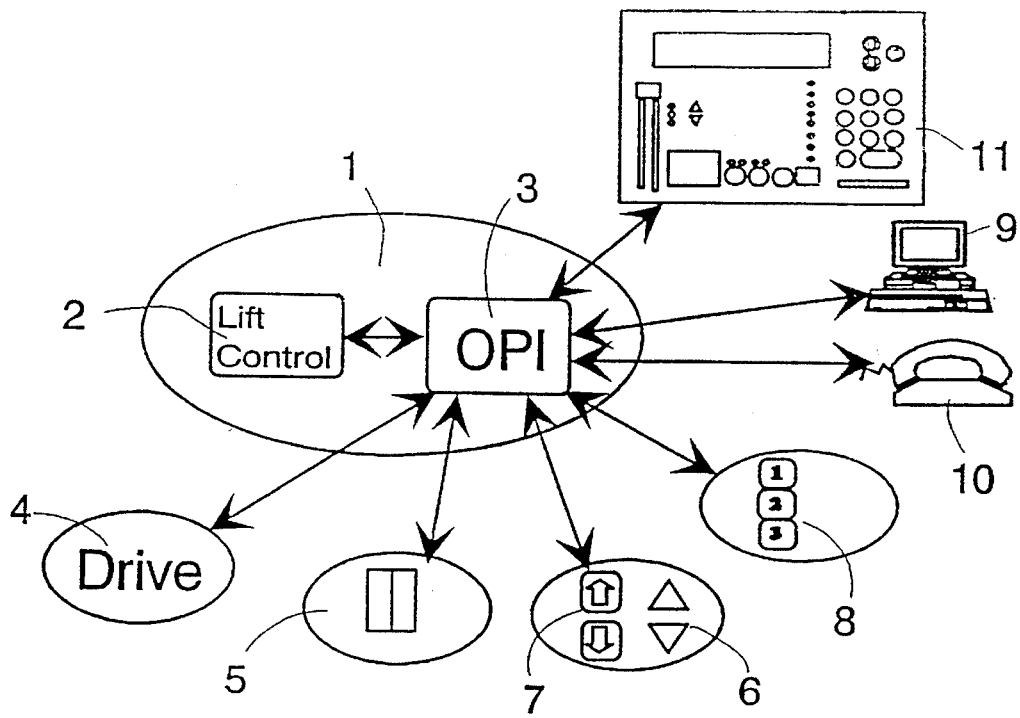
FIG. 1 illustrates the connections of an operator interface in an elevator control system.

FIG. 1 presents a diagram of the functional connections of an operator interface 3 and an elevator control system 2 contained in an elevator control unit 1. The elevator control system 2 controls the operation of the elevator drive 4, doors 5 and indicators 6. Connected to the elevator control system are also the landing and car call buttons 7 and 8. Placed in the elevator control unit is an operator interface terminal 11, by means of which the functions of the elevator can be tested and monitored. The configuration and the parameters can be changed by means of the operator interface terminal 11. The operator interface observes when the parameter concerns the whole elevator group. When a group parameter is changed, the control unit checks that parameters are changed in every elevator control unit of the group. The operation can also be monitored and controlled from outside the elevator control unit by means of a separate terminal 9 or a modem 10. The elevator control unit may also incorporate a group control system controlling the operation of a group of several elevators. In the operational hierarchy, the group control system is above the elevator control system.

Figure 2:
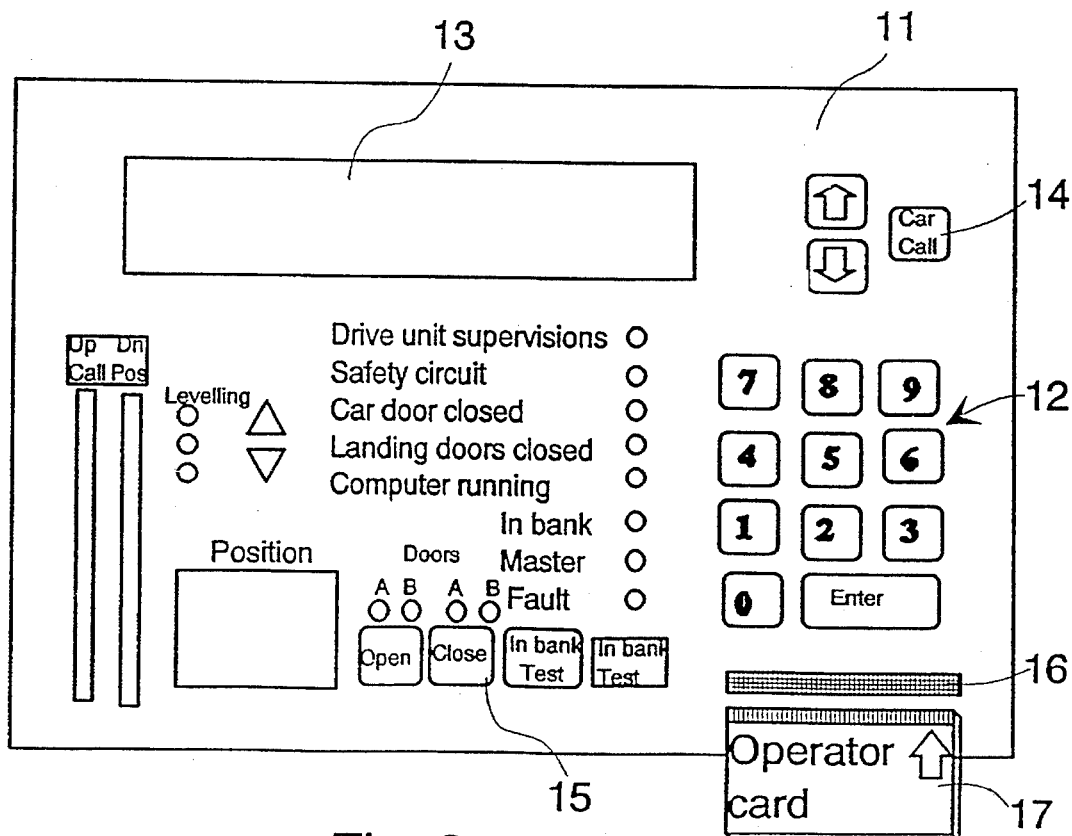
FIG. 2 represents a terminal used in the operator interface of an elevator.

As shown in FIG. 2, the operator interface terminal 11 is provided with a keypad 12 which can be used to give functional commands to the various units of the elevator. The instructions given by the elevator control system and the operator commands can be read in the display 13. The terminal also contains indicator units showing the operation and status of the elevator and its parts, e.g. indicators showing the car calls 14, door operation 15 and car position. According to the invention, the terminal 11 is provided with a connector 16 for the connection of a storage card 17 to the terminal. The connector 16 is linked with the internal address and data bus of the terminal.

When the control system of an elevator is being installed, the elevator-specific configuration and parameter data are transferred to the elevator control system by means of a storage card 17. Thus, the elevator components can be supplied separately and even from a different production unit. The elevator-specific information can be easily transferred to a service center by means of a storage card.

Parameters that are common to all or several elevators of the group are dated simultaneously and in a concentrated way. The operator interface checks which parameters are common to several elevators and takes care that they are all installed automatically to all elevators in the group. Thus it is ensured that every group parameter has the same value in each elevator.

In a decentralized elevator control system the elevator-specific configuration and parameter data are transferred to the elevator control system during the start-up drive. The function of the system can be changed later by changing this data. This information is stored into a non-volatile memory in the operator interface. This memory works as a certain kind of master copy and the other components can read the data from the memory whenever required.

When constructing a new building the elevators function in a different way as in the normal situation. Many parameters, such as door closing times, acceleration, deceleration and driving velocity of the elevator car must be changed for construction time use.

When a serviceman starts his work, he will first insert his storage card 17 into the connector 16 provided in the operator interface terminal 11. A processor in the control unit reads the information from the storage card 17. This information has been drawn up for the particular service task and/or is personal according to the degree of authority of the person in question.

The storage card 17 contains the data for the verification of the operator's right of operation, the passwords and the extent of operations permissible to the operator. The storage card 17 determines the language of the texts to be displayed as well as the extent and degree of detail of the instructions to be given to the operator. In this way, each operator is given instructions specifically adapted to the person in question. A person's authorization can also be easily updated by altering the information stored on the personal storage card.

In the case of changed needs, some of the elevator-specific parameter data have to be modified. By using a storage card 17, the new data can be transferred and the updating carried out without removing the memory circuits in the control unit. Updating becomes simpler and more reliable because the update can be tested beforehand. Along with the updated data, the storage card also carries the programs and instructions needed in the updating process.

The storage card 17 intended for the serviceman contains the failure message texts and the instructions for fault location. The instructions are always available and relate to the situation at hand. The instructions are tailored according to the installer's requirements and wishes. The storage card also serves as a means of transferring feedback data from the operator to the service center and production process for further development of activities.

The functions mentioned above can be placed on one or more storage cards, depending on the need and the operator's degree of authority.

The invention has been described above by the aid of one of its embodiments. However, the presentation is not to be regarded as limiting the invention, but instead the embodiments of the invention may vary within the limits defined by the following claims.

We claim:

1. Procedure for supplying and modifying data required in a control system of an elevator of an elevator group and for producing instructions needed for at least one of installation, maintenance, repair and modification on a display in the control system, comprising the steps of:

storing parameter data of the control system and preselected instruction data for each operator carrying out work in a separate individualized storage unit;

when modification, repair or maintenance work is being carried out on the elevator, establishing a communication link between said separate storage unit and a data storage of a control unit in the control system;

supplying said data stored in said separate individualized storage unit to said control unit;

saving the supplied data in the control unit;

producing instructions to the operator in accordance with the parameter data and preselected instruction data supplied from the separate individualized storage unit and saved in the control unit;

carrying out at least one of installation, maintenance, repair, and modification in accordance with said instructions; and storing failure and feedback information from said control unit in said separate individualized storage unit in connection with operation and testing.

2. Procedure according to claim 1, further comprising, when the instructions needed are for installation, storing parameter and program data for an elevator in said separate individualized storage unit, and reading the parameter and program data contained in said separate storage unit into the control system.

3. Procedure according to claim 1, further comprising, when the instructions are needed for modification, storing at least one of modified program and parameter data in said separate individualized storage unit, and reading said at least one of modified program and parameter data into the control system.

4. Procedure according to claim 1, further comprising, when the instructions are needed for at least one of maintenance and repair, loading instruction data required by maintenance and repair work into the control system from said separate individualized storage unit and wherein said producing step comprises displaying said instruction data on a text display in the control unit.

5. Procedure according to claim 4, further comprising presenting said instruction data in a language selected from data on said separate individual storage unit.

6. Procedure according to claim 5, further comprising that the storage unit comprises the verification, extension and limitation of the right of operation.

7. Procedure according to claim 1, wherein said separate individualized storage unit is a storage card and said establishing step comprises inserting said storage card into an operator interface connector provided in the control unit.

8. Procedure according to claim 1, wherein the elevator control system employs serial communication.

9. Procedure according to claim 1, further comprising checking if the parameter data for installation stored in said separate storing unit concern several elevators in the group and if said checking step is affirmative, storing said parameter data into every elevator in the elevator group.

10. Procedure according to claim 1, further comprising storing parameters concerning elevator-specific configuration of a decentralized elevator control in a non-volatile memory in said separate storage unit.

11. Procedure for supplying and modifying data required in a control system of an elevator of an elevator group and for producing instructions needed for at least one of installation, maintenance, repair and modification on a display in the control system, comprising the steps of:

storing parameter data of the control system and preselected instruction data for each operator carrying out work in a separate individualized storage unit;

when modification, repair or maintenance work is being carried out on the elevator, establishing a communication link between said separate storage unit and a data storage of a control unit in the control system;

supplying said data stored in said separate individualized storage unit to said control unit;

saving the supplied data in the control unit;

producing instructions to the operator in accordance with the parameter data and preselected instruction data supplied from the separate individualized storage unit and saved in the control unit;

carrying out at least one of installation, maintenance, repair, and modification in accordance with said instructions;

storing parameters concerning elevator-specific configuration of a decentralized elevator control in a non-volatile memory in said separate storage unit; and during a start-up drive and after changing the configuration, checking the configuration data of all the elevators of the elevator group.

12. Procedure according to claim 11, further comprising storing failure and feedback information from said control unit in said separate individualized storage unit in connection with operation and testing.

13. An elevator control apparatus comprising:

a control unit which controls the operation of the elevator;

an operator interface unit which tests, monitors and alters the operation of the elevator, said operator interface unit comprising a connection which connects a separate, individualized storage to said operation interface unit;

means for determining, from the separate individualized storage unit, parameter data specific to an operation and preselected instruction data specific to an operator and said operation;

an internal storage unit in said control unit which stores said parameter and preselected instruction data from said separate individualized storage unit;

means, in said control unit, for producing instructions in accordance with said data stored in said internal storage unit and for outputting said instructions to said operating interface unit;

a non-volatile memory in said separate storage unit storing parameters concerning elevator-specific configuration of a decentralized elevator control; and means for checking, during a start-up drive and after changing the configuration, the configuration data of all the elevators of the elevator group.

14. An elevator control apparatus comprising:

a control unit which controls the operation of the elevator;

an operator interface unit which tests, monitors and alters the operation of the elevator, said operator interface unit comprising a connection which connects a separate, individualized storage to said operation interface unit;

means for determining, from the separate individualized storage unit, parameter data specific to an operation and preselected instruction data specific to an operator and said operation;

an internal storage unit in said control unit which stores said parameter and preselected instruction data from said separate individualized storage unit;

means, in said control unit, for producing instructions in accordance with said data stored in said internal storage unit and for outputting said instructions to said operating interface unit, wherein said separate individualized storage unit further stores feedback data from said control unit in connection with operation and testing.

15. Procedure according to claim 12, further comprising, when the instructions needed are for installation, storing parameter and program data for an elevator in said separate individualized storage unit, and reading the parameter and program data contained in said separate storage unit into the control system.

16. Procedure according to claim 12, further comprising, when the instructions are needed for modification, storing at least one of modified program and parameter data in said separate individualized storage unit, and reading said at least one of modified program and parameter data into the control system.

17. Procedure according to claim 12, further comprising, when the instructions are needed for at least one of maintenance and repair, loading instruction data required by maintenance and repair work into the control system from said separate individualized storage unit and wherein said producing step comprises displaying said instruction data on a text display in the control unit.

18. Procedure according to claim 17, further comprising presenting said instruction data in a language selected from data on said separate individual storage unit.

19. Procedure according to claim 12, wherein said separate individualized storage unit is a storage card and said establishing step comprises inserting said storage card into an operator interface connector provided in the control unit.

20. Procedure according to claim 12, further comprising checking if the parameter data for installation stored in said separate storing unit concern several elevators in the group and if said checking step is affirmative, storing said parameter data into every elevator in the elevator group.

21. An elevator control apparatus according to claim 13, wherein said separate individualized storage unit further stores feedback data from said control unit.

22. An elevator control apparatus according to claim 13, further comprising, when the instructions needed are for installation, means for storing parameter and program data for an elevator in said separate individualized storage unit, and means for reading the parameter and program data contained in said separate storage unit into the control system.

23. An elevator control apparatus according to claim 13, further comprising, when the instructions are needed for modification, means for storing at least one of modified program and parameter data in said separate individualized storage unit, and reading said at least one of modified program and parameter data into the control system.

24. An elevator control apparatus according to claim 13, further comprising, when the instructions are needed for at least one of maintenance and repair, means for loading instruction data required by maintenance and repair work into the control system from said separate individualized storage unit and means for displaying said instruction data on a text display in the control unit.

25. An elevator control apparatus according to claim 24, further comprising means for presenting said instruction data in a language selected from data on said separate individual storage unit.

26. An elevator control apparatus according to claim 13, wherein said separate individualized storage unit is a storage card and said connection includes inserting said storage card into an operator interface connector provided in the control unit.

27. An elevator control apparatus according to claim 13, further comprising means for checking if the parameter data for installation stored in said separate storing unit concerns several elevators in the group and, if affirmative, storing said parameter data into every elevator in the elevator group.

28. An elevator control apparatus according to claim 14, further comprising, when the instructions needed are for installation, means for storing parameter and program data for an elevator in said separate individualized storage unit, and means for reading the parameter and program data contained in said separate storage unit into the control system.

29. An elevator control apparatus according to claim 14, further comprising, when the instructions are needed for modification, means for storing at least one of modified program and parameter data in said separate individualized storage unit, and reading said at least one of modified program and parameter data into the control system.

30. An elevator control apparatus according to claim 14, further comprising, when the instructions are needed for at least one of maintenance and repair, means for loading instruction data required by maintenance and repair work into the control system from said separate individualized storage unit and means for displaying said instruction data on a text display in the control unit.

31. An elevator control apparatus according to claim 30, further comprising means for presenting said instruction data in a language selected from data on said separate individual storage unit.

32. An elevator control apparatus according to claim 14, wherein said separate individualized storage unit is a storage card and said connection includes inserting said storage card into an operator interface connector provided in the control unit.

33. An elevator control apparatus according to claim 14, further comprising means for checking if the parameter data for installation stored in said separate storing unit concerns several elevators in the group and, if affirmative, storing said parameter data into every elevator in the elevator group.

* * * * *